United States Patent
Thorstensen et al.

(10) Patent No.: US 7,123,153 B2
(45) Date of Patent: Oct. 17, 2006

(54) SYSTEM AND METHOD FOR TRACKING INDIVIDUALS

(75) Inventors: Bjorn Thorstensen, Tromso (NO); Tore Syversen, Tromso (NO); Bente Evjemo, Tromso (NO); Oyvind Johnsen, Harstad (NO); Terje Geir Solvoll, Tromso (NO); Sigmund Akselsen, Harstad (NO); Arne Munch-Ellingsen, Tromso (NO); Haakon Karlsen, Jr., Lyngseidet (NO)

(73) Assignee: Telenor ASA, Fornebu (NO)

( * ) Notice: Subject to any disclaimer, the term of this patent is extended or adjusted under 35 U.S.C. 154(b) by 225 days.

(21) Appl. No.: 10/507,547

(22) PCT Filed: Mar. 21, 2003

(86) PCT No.: PCT/NO03/00098

§ 371 (c)(1),
(2), (4) Date: Sep. 14, 2004

(87) PCT Pub. No.: WO03/079773

PCT Pub. Date: Oct. 2, 2003

(65) Prior Publication Data

US 2005/0265272 A1 Dec. 1, 2005

(30) Foreign Application Priority Data

Mar. 21, 2002 (NO) .................................. 20021435

(51) Int. Cl.
 *G08B 23/00* (2006.01)
(52) U.S. Cl. .............................. 340/573.3; 340/539.13; 340/539.15; 340/825.49
(58) Field of Classification Search .............. 340/573.3, 340/539.13, 572.1, 825.49, 573.1, 573.4, 340/539.15
See application file for complete search history.

(56) References Cited

U.S. PATENT DOCUMENTS

| 5,791,294 | A | 8/1998 | Manning ..................... 119/721 |
| 5,868,100 | A | 2/1999 | Marsh ......................... 119/421 |
| 6,346,885 | B1 * | 2/2002 | Curkendall ............... 340/572.4 |
| 7,061,385 | B1 * | 6/2006 | Fong et al. ............... 340/573.4 |
| 2002/0021219 | A1 | 2/2002 | Edwards ................... 340/573.1 |

(Continued)

FOREIGN PATENT DOCUMENTS

DE 100 45469 4/2002

(Continued)

*Primary Examiner*—Toan N. Pham
(74) *Attorney, Agent, or Firm*—Schneck & Schneck; Thomas Schneck

(57) ABSTRACT

A system and method of tracking individuals divided into flocks by means of radio communication and positioning systems is disclosed. A flock leader is provided with a first electronic device (1) comprising a first transceiver (2) operating in a public radio communication network, e.g. GSM or GPRS, a position tracker (3), e.g. a GPS-receiver, and a second transceiver (4) operating in a short distance radio communication system, e.g. Bluetooth®. Each of the remaining individuals in the flock is provided with a second electronic device (6) comprising at least a third transceiver (7) also operating in the short distance radio communication system. The second electronic device (6) periodically transmits data identifying the associated individual to the first electronic device (1), so that the flock leader knows that the individual is localized in the flock (i.e. within the coverage area of the short distance radio communication system) as long as it receives the data. The first electronic device (1) communicates with a system controller through a public radio communication network managing the system and keeping track of the individuals in each flock.

25 Claims, 2 Drawing Sheets

U.S. PATENT DOCUMENTS

2005/0200487 A1* 9/2005 O'Donnell et al. ...... 340/573.1

FOREIGN PATENT DOCUMENTS

| EP | 0 945060 | 9/1999 |
| EP | 1 172663 | 1/2002 |
| WO | 02/37952 | 5/2002 |
| WO | 02/076193 | 10/2002 |

\* cited by examiner

SYSTEM AND METHOD FOR TRACKING INDIVIDUALS

FIELD OF THE INVENTION

The present invention relates to tracking of individuals in a flock by means of radio communication and positioning systems.

BACKGROUND OF THE INVENTION

As long as livestock farming has existed, it has always been necessary to herd animals, protecting them against predators and accidents, and keeping them together for making the loss of animals as low as possible.

Even today, traditional herding, which has been used for thousands of years where one or more persons always follow the flock as long as they are on free pasture, is the most common.

Naturally, this old fashioned herding is very expensive as it continuously occupies human recourses in a very ineffective way. This is the reason why many farmers have decided to skip herding, but, as a consequence, by the end of the season the loss of animals has been considerable. However, there is an increasing demand in the public opinion for high food quality, but also for a good treatment of the animals in their lifetime.

One way of remotely tracking animals is to place a VHF radio transmitter on the individual animals of interest and determining their approximate positions based upon the signal strength of the radio signals from the transmitter at a receiver. This solution has traditionally been used for scientific purposes on wild individual animals. It is not designed for collecting data other than for an approximate position, and each monitored individual animal must be provided with a long distance transmitter, which will be relatively expensive for a whole flock. Besides, a transmitter also transmitting additional condition data, e.g., body temperature and humidity, would be rather heavy.

From U.S. Pat. Nos. 5,868,100 and 5,791,294, U.S. patent application 2002/0021219 and European patent application EP 945060 there are known a number of more or less similar systems for tracking and monitoring animals. Each monitored animal is wearing an electronic device comprising communication and positioning equipment. The positioning equipment is a GPS unit. Such devices tend to become heavy and are therefore not suited for young animals. In addition, the devices are costly. Thus, such systems are less applicable for tracking and monitoring flocks of livestock; they are used nearly exclusively for monitoring single individual animals for scientific purposes.

Consequently, there is a need for a system remotely tracking animals in a flock with a minimum of heavy equipment and with the possibility of monitoring the condition and health of the animals.

SUMMARY OF THE INVENTION

It is an object of the present invention to provide a system and method which allows monitoring of all animals of a flock with only a cheap and simple short distance transceiver (e.g. as an ear marker) placed on each animal.

Another object of the present invention is to keep track of the animals even when they roam from one flock to another, without being regarded as lost.

The objects above is achieved in a system according to the invention for tracking individuals divided into one or more flocks, wherein at least one individual in each flock, from now on called the flock leader, being provided with a first electronic device including a position tracker and radio communication equipment, in which system said radio communication equipment includes at least a first transceiver operating in a public radio communication network, and a second transceiver operating in a short distance radio system, at least one other individual belonging to a flock being provided with a second electronic device, said second electronic device including at least a third transceiver also operating in the short distance radio system and being arranged to communicate with the second transceiver of said radio communication equipment, each second electronic device being arranged to transmit at least an identification code uniquely identifying said second device to a first electronic device present in the flock through the short distance radio system, thereby indicating the presence of the associated individual in a flock.

The invention also comprises a method involving to provide at least one individual in each flock, called the flock leader, with a first electronic device, said first electronic device including a position tracker, a first transceiver operating in a public radio communication network, and a second transceiver operating in a short distance radio system, to provide at least one other individual belonging to a flock with a second electronic device, said second electronic device including a third transceiver also operating in the short distance radio system, to transmit from each second electronic device at least an identification code uniquely identifying said second device to a first electronic device present in the flock through the short distance radio system, thereby indicating the presence of the associated individual in a flock.

Other embodiments of the invention appear from the appended dependent claims.

BRIEF DESCRIPTION OF THE DRAWING

The invention will now be described in detail in reference to the appended drawings, in which.

DETAILED DESCRIPTION OF PREFERRED EMBODIMENTS

In the following, the invention will be described in connection with animal flocks and herding. However, the reader should keep in mind that man is an animal species. Thus, the invention may advantageously be utilized for tracking other individuals gathered together, e.g. as a security system for human beings travelling in groups. The invention may also find application for keeping track of persons present in a building complex, and evacuating said persons in case of an emergency. For that means, the invention may be used for keeping track of non-living "individuals", e.g. in an automated stock keeping system. Therefore, the term "individual" must be interpreted in the widest possible way, covering both living beings and inanimate objects.

The present invention takes advantage in the fact that animals on pasture tend to follow each other in a flock. Animals like sheep, cattle and reindeer are by nature gregarious animals and it is also in the farmer's interest that the animals always stay in a flock.

The system according to the present invention comprises a main terminal localized on the leader of the flock—from now on called the bell sheep, or alternatively on a limited number of the animals within the flock. This main terminal is preferably a terminal operating in a public radio communication network like GSM, GPPS, UMTS, or even WLAN. In addition, a position tracker, preferably a GPS receiver, is integrated in the main terminal. For communication with the other animals in the flock, the main terminal is also provided with a short distance radio transceiver, e.g. a Bluetooth® device or a device operating in the ISM frequency bands or other open frequency bands (like 433 MHz). The communication with the respective distributed terminals is separated according to the protocol being used (e.g. Bluetooth® or 433 MHz protocol). The main terminal can be worn by the bell sheep in a collar. Bluetooth® is a trademark owned by Bluetooth SIG, Inc. The Bluetooth® system is a short range radio communication system operating on 2.4 GHz.

Figure 2:
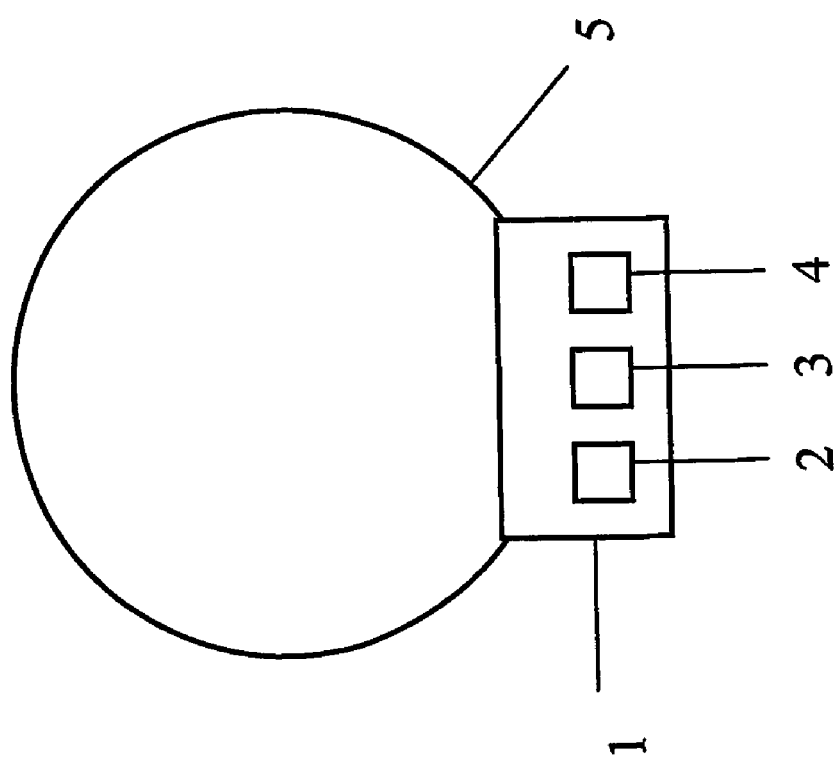
FIG. 2 shows a collar to be worn by bell sheep.

The main terminal is illustrated in FIG. 2. The main terminal 1, also called the first electronic device, includes a positioning device 2, a first radio transceiver 3 operating in the public radio network and a second radio transceiver 4 operating in a short range communication system, as detailed above. The main terminal 1 can be fastened to a bell sheep with a collar 5. In addition, the main terminal 1 includes a source of electric power, e.g. a battery (not shown).

Each of the other animals in the flock is provided with a much simpler terminal adapted to communicate with the main terminal placed on the bell sheep by means of the chosen short distance communication system (e.g. Bluetooth® or 433 MHz). Preferably, this terminal should be small enough to form an earmark on the animal's ear.

Figure 1:
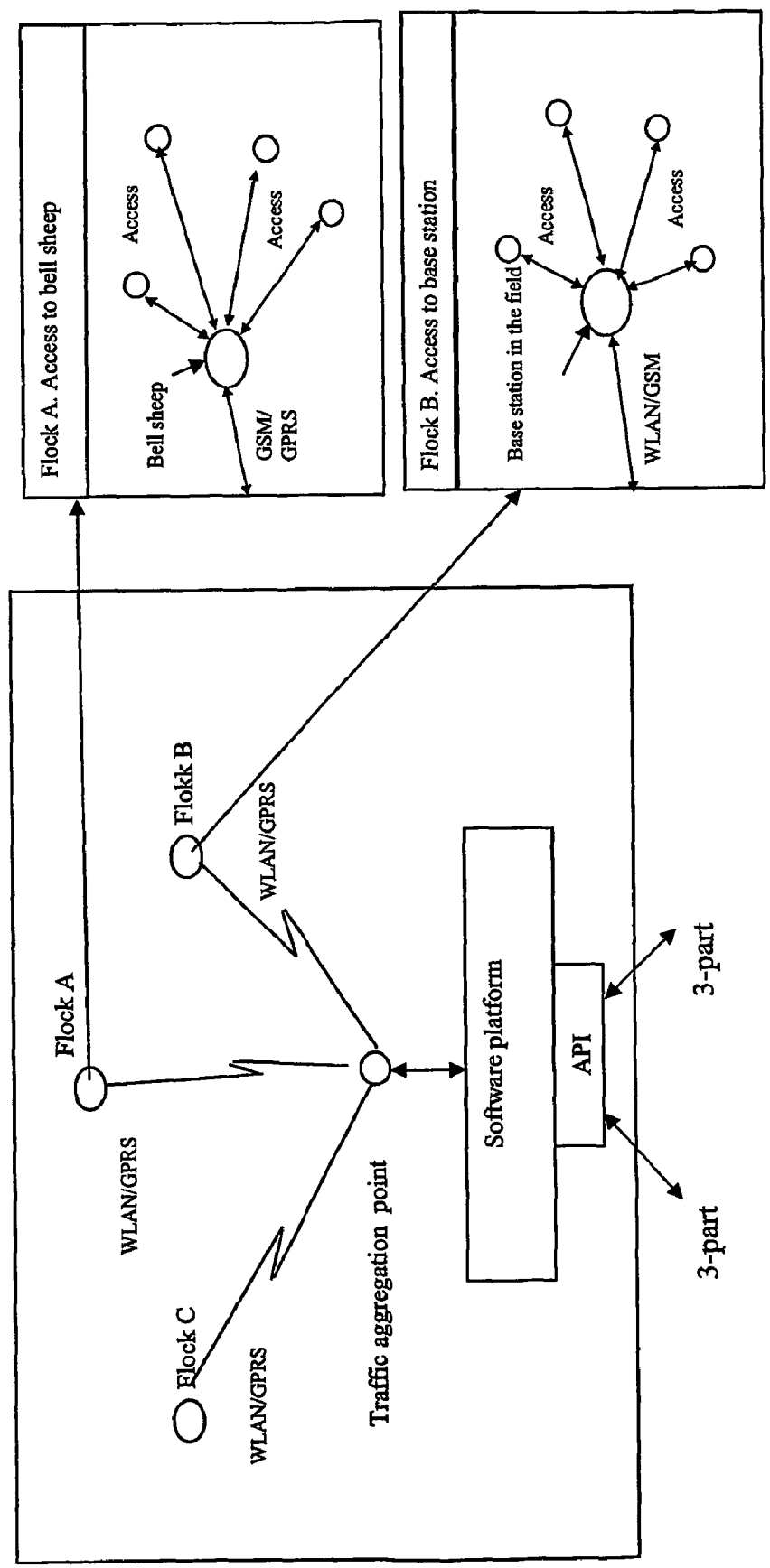
FIG. 1 is an overview of the structure of the system according to the present invention.
Figure 3:
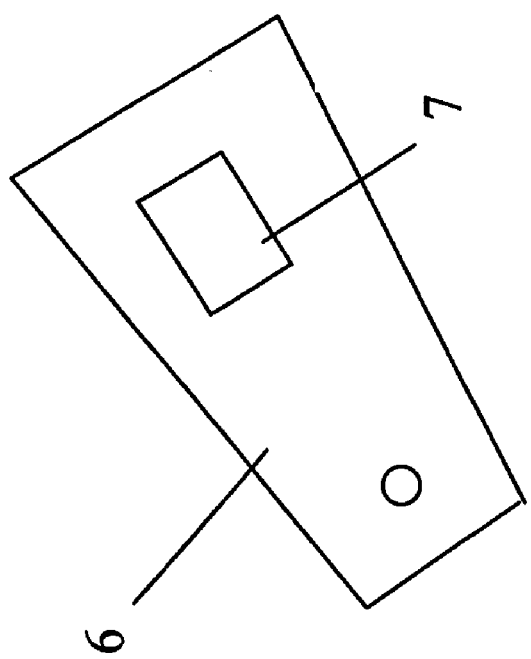
FIG. 3 shows an ear mark to be worn by junior sheep.

A possible embodiment of such a simplified terminal is shown in FIG. 3. The terminal 6 is designed as a common earmark with an embedded third radio transceiver 7 operating in the short range communication system mentioned above. The terminal 6 is equipped with a power source, preferably a battery (not shown).

Each distributed terminal 6 is assigned an identification (ID) uniquely identifying the associated animal. The short distance radio transceiver 4 in the main terminal will act as a mobile base station and portal for the distributed terminals within the flock. The mobile base stations for a number of flocks in the system then create a dynamic piconet structure of moving coverage areas.

The distributed terminals 6 are only able to communicate with the main terminal 1 when the respective animals are localized within the coverage area of the main terminal 1. In other words, an animal is regarded as being lost from the flock when the main terminal is unable to communicate with the distributed terminal 6 of the respective animal.

Furthermore, the main terminal 1 may be provided with a processor and a memory for storing and processing the data received from the distributed terminals. This data includes as a minimum the above-mentioned ID. Preferably, the data may also include different condition data, e.g. body temperature, collected from different sensors on the animal. The time period between transmissions of data to the main terminal may be constant, e.g. 5–10 min., and when the distributed terminals 6 are not transmitting, they are set in an idle mode for saving battery power.

According to the system of the present invention, and as already indicated, the main terminal 1 will always know the presence of all the animals in the flock, simply by checking it the respective distributed terminals 6 transmit data and/or respond on a request. Any change in the presence condition for an animal will be reported to the central system controller described below. The system will also keep track of the position of the bell sheep, and hence also the approximate position of the rest of the flock, due to the positioning system integrated in the main terminal and the fact that the animals in communication with the bell sheep have to be in the proximity of the bell sheep. The positioning system can be a GPS receiver or any other means for obtaining position information, e.g. means for fetching said information from a mobile network.

This presence and positioning information, and possibly the additional data mentioned above, will then be available to the external world due to the fact that the main terminal is connected to a public radio communication network like GSM, GPRS, UMTS, or WLAN.

According to a preferred embodiment of the invention, each individual animal may roam from one flock to another and then start communicating with the bell sheep in a new flock. The roaming animal will then be registered as a member of the new flock and deleted in the old flock, and repositioned according to the position of the bell sheep.

The system includes a central system controller which inter alia manages the availability of the data in each flock and the roaming feature mentioned above. The system controller is arranged to store (e.g. in a database) all animals registered in the system and associated information, such as in which flock a respective animal is presently localized, which sensors are arranged on the animal (if any), if there are any alarms active for that animal, etc. The system controller keeps track of to which flock each animal currently belongs in that when a main terminal of a flock detects signals transmitted from a new roaming animal, it will relay the ID of the animal to the central system controller and mark it as an ID of a new member of the flock. The central system controller will then update the information in its databases regarding to which flock the animal currently belongs.

The system controller includes middleware and provides an application interface allowing a third part system developer to fetch data from the animals and to configure the system. The functionalities of the application interface should preferably be at the 6/7 layer in the OSI model, and the platform of the system controller is preferably based on EJB (Enterprise Java Beans).

As a user example, when a system user wants to fetch, e.g., the position of a certain animal registered in the system, the user transmits a request to the system controller. The system controller will determine to which flock the animal currently belongs, e.g. by a lookup in the database, and relay the request to the main terminal of the corresponding bell sheep over the radio communication system being used. The main terminal responds by returning the current position provided by its own GPS receiver. If the request is related to other data, the main terminal will fetch the data for the animal of interest already stored in the is memory, or transmit a request to the distributed terminal of the animal. The middleware will also provide other features like streaming of data, configuration of equipment, monitoring of parameters, etc.

Further, according to a preferred embodiment of the present invention, the system is provided with an alarm feature. An alarm associated with an animal will be activated when periodic signals from that animal fail to occur within a predefined time period since last detected signal. The alarm may, e.g., trigger sending of an e-mail or a short message to a person being responsible for the animal.

The present invention utilizes the fact that short distance radio communication equipment has limited radio coverage area to detect when an animal has lost its flock. This is also utilized to determine an approximate position of an animal only by providing one or a limited number of animal(s) with positioning tracker(s) (GPS receiver) per flock.

The invention claimed is:

1. A system of tracking individuals divided into one or more flocks comprising: at least one individual flock leader in each flock being provided with a first electronic device including a position tracker and radio communication equipment, the radio communication equipment includes at least a first transceiver operating in a public radio communication network, and a second transceiver operating in a short distance radio system, at least one other individual belonging to a flock being provided with the second electronic device, said second electronic device including at least a third transceiver also operating in the short distance radio system and being arranged to communicate with the second transceiver of said radio communication equipment, each second electronic device being arranged to transmit at least an identification code uniquely identifying said second device to a first electronic device present in the flock through the short distance radio system, thereby indicating the presence of the associated individual in a flock.

2. A system as claimed in claim 1 further comprising a system controller arranged to communicate with the flock leader(s) of each flock through the public radio communication network managing the system and storing system information and information regarding all registered individuals of the system including at least the identity of each individual, to which flock each individual currently belongs, an indication of which individuals being the flock leader(s) of each flock and a public radio communication network address of all the flock leader(s) of the system.

3. A system as claimed in claim 2 wherein the system controller includes an application interface allowing a third party or a user of the system to fetch data regarding the individuals.

4. A system as claimed in claim 2 wherein when an individual roams from a first flock to a second flock, the system controller is updated so that the information regarding the flock belonging of the individual is changed from the first flock to the second flock.

5. A system as claimed in claim 2 wherein an alarm is activated for an individual when a predefined time period since last reception of data from the individual to the flock leader of the individual's associated flock has elapsed and no other flock leader of the system has received data from the individual within the same time period.

6. A system as claimed in claim 5 wherein the alarm initiates sending of an e-mail or a short message to a person responsible for the individual for which the alarm is activated.

7. A system as claimed in claim 1 wherein the transmission of at least an identification code uniquely identifying the respective individuals to the flock leader(s) of the flock is accomplished periodically.

8. A system as claimed in claim 1 wherein the first electronic device also includes a memory and a processor for storing at least the identities of the individuals currently associated with the corresponding flock.

9. A system as claimed in claim 8 wherein the data is transmitted from the individuals to the associated flock leader together with the identification code and stored in the memory of the respective first electronic device.

10. A system as claimed in claim 1 wherein each electronic device is provided with sensors sensing data regarding the condition of each individual.

11. A system as claimed in claim 1 wherein the public radio communication network is a GSM, GPRS, UMTS or WLAN network and the public radio communication network address is a telephone number or an IP address.

12. A system as claimed in claim 1 wherein the position tracker is a GPS receiver.

13. A system as claimed in claim 1 wherein the position tracker obtains its information from the public radio communication network.

14. A system as claimed in claim 1 wherein the short distance radio system is a Bluetooth® system or a system operating in the ISM frequency bands or other open frequency bands like 433 mHz.

15. A system as claimed in claim 1 wherein the individuals are animals.

16. A system as claimed in claim 15 wherein the second electronic device is formed as a collar or a light-weight earmark attached to a respective ear of each animal.

17. A system as claimed in claim 1 wherein first electronic devices act as mobile base stations in a dynamic piconet structure of moving coverage areas limited by the coverage areas of the second transceivers of the respective first electronic devices.

18. A method for tracking individuals divided into one or more flocks, comprising: providing at least one individual flock leader in each flock with a first electronic device, said first electronic device including a position tracker, a first transceiver operating in a public radio communication network, and a second transceiver operating in a short distance radio system, and providing at least one other individual belonging to a flock with a second electronic device, said second electronic device including a third transceiver also operating in the short distance radio system, to transmit from each second electronic device at least an identification code uniquely identifying said second electronic device to said first electronic device present in the flock through the short distance radio system, thereby indicating the presence of the associated individual in a flock.

19. A method as claimed in claim 18 further comprising communicating from said first electronic device present in each flock with a system controller through the public radio communication network, said system controller managing the system and storing system information and information regarding all registered individuals of the system including at least the identity of each individual, to which flock each individual currently belongs, an indication of which individuals being the flock leader(s) of each flock and a public radio communication network address of all the flock leader(s) of the system.

20. A method as claimed in claim 19 wherein when an individual roams from a first flock to a second flock, the system controller is updated so that the information regarding the flock belonging of the individual is changed from the first flock to the second flock.

21. A method as claimed in claim 19 wherein an alarm is activated for an individual when a predefined time period since last reception of data from the individual to the flock leader of the individual's associated flock has elapsed and no other flock leader of the system has received data from the individual within the same time period.

22. A method as claimed in claim 21 wherein the alarm initiates sending of an e-mail or a short message to a person responsible for the individual for which the alarm is activated.

23. A method as claimed in claim 18 further comprising transmitting periodically at least an identification code uniquely identifying the respective individuals to the first electronic device worn by flock leader(s) of the flock.

24. A method as claimed in claim 18 wherein the first electronic device is storing at least the identities of the individuals currently associated with the corresponding flock.

25. A method as claimed in claim 18 wherein each second electronic device is sensing data regarding the condition of each individual, transmitting said data to the associated first electronic device, whereupon the data is stored in a memory in said first electronic device.

* * * * *

UNITED STATES PATENT AND TRADEMARK OFFICE
CERTIFICATE OF CORRECTION

PATENT NO.       : 7,123,153 B2
APPLICATION NO.  : 10/507547
DATED            : October 17, 2006
INVENTOR(S)      : Bjorn Thorstensen et al.

It is certified that error appears in the above-identified patent and that said Letters Patent is hereby corrected as shown below:

Column 3, line 6, fourth word, second acronym: GPPS should read --GPRS--.

Signed and Sealed this

Sixteenth Day of December, 2008

JON W. DUDAS
*Director of the United States Patent and Trademark Office*